US012339013B1

(12) United States Patent
Yu et al.

(10) Patent No.: US 12,339,013 B1
(45) Date of Patent: Jun. 24, 2025

(54) PLASMA STOVE

(71) Applicant: SHENZHEN TERRA MAESTRO TECHNOLOGY CO., LTD., Shenzhen (CN)

(72) Inventors: Bao-Quan Yu, Fuzhou (CN); Nan-Qiao Yao, Shenzhen (CN); Chung Wai, Shenzhen (CN)

( * ) Notice: Subject to any disclaimer, the term of this patent is extended or adjusted under 35 U.S.C. 154(b) by 0 days.

(21) Appl. No.: 18/812,219

(22) Filed: Aug. 22, 2024

(30) Foreign Application Priority Data

Feb. 2, 2024 (CN) ........................ 202420257591.7
Feb. 2, 2024 (CN) ........................ 202420257597.X

(51) Int. Cl.
*F24C 7/06* (2006.01)
*H05H 1/24* (2006.01)

(52) U.S. Cl.
CPC ............... *F24C 7/062* (2013.01); *H05H 1/24* (2013.01); *H05H 2245/80* (2021.05)

(58) Field of Classification Search
None
See application file for complete search history.

(56) References Cited

U.S. PATENT DOCUMENTS

2019/0380764 A1* 12/2019 Canady ................ A61B 18/042

FOREIGN PATENT DOCUMENTS

CN 111795409 A * 10/2020
CN 212082039 U * 12/2020
CN 113310077 A * 8/2021 ......... B01D 46/0036
CN 217423338 U * 9/2022
CN 217470354 U * 9/2022
CN 217635785 U * 10/2022
CN 116182208 A * 5/2023
CN 219436207 U * 7/2023
CN 116817329 A * 9/2023
CN 117128545 A * 11/2023
CN 220303716 U * 1/2024
CN 220338527 U * 1/2024

OTHER PUBLICATIONS

Machine translation of CN-116182208-A, 10/1024 (Year: 2024).*

(Continued)

*Primary Examiner* — Geoffrey S Evans
(74) *Attorney, Agent, or Firm* — Nitin Kaushik

(57) ABSTRACT

A plasma stove includes a carrier, an electric fire assembly, an electric control device, and an electrical connecting assembly. The carrier includes a housing and a support platform on the housing. The electric fire assembly includes a plasma needle, an electrode tip connected to the plasma needle, and an ignition head. The plasma needle and the ignition head are arranged on the housing and in the support platform. The electric control device in the housing includes a circuit board and a step-up transformer connected to the circuit board. The plasma needle and the ignition head are connected to the circuit board through the electrical connecting assembly. The electrical connecting assembly includes a conductive connector connected to the plasma needle and a flexible conductor. The flexible conductor includes a first connecting end detachably connected to the connector and a second connecting end detachably connected to the circuit board.

20 Claims, 11 Drawing Sheets

(56) References Cited

OTHER PUBLICATIONS

Machine translation of CN-217635785-U, Oct. 2024 (Year: 2024).*
Machine translation of CN-212082039-U, Oct. 2024 (Year: 2024).*
Machine translation of CN-111795409-A, Nov. 2024 (Year: 2024).*
Machine translation of CN-113310077-A, Nov. 2024 (Year: 2024).*
Machine translation of CN-220303716-U, Nov. 2024 (Year: 2024).*
Machine translation of CN-220338527-U, Nov. 2024 (Year: 2024).*
Machine translation of CN-117128545-A, Nov. 2024 (Year: 2024).*
Machine translation of CN-219436207-U, Nov. 2024 (Year: 2024).*
Machine translation of CN-217423338-U, Nov. 2024 (Year: 2024).*
Machine translation of CN-116817329-A, Nov. 2024 (Year: 2024).*
Machine translation of CN-217470354-U, Nov. 2024 (Year: 2024).*

* cited by examiner

PLASMA STOVE

FIELD

The subject matter herein generally relates to a plasma stove that is easy to miniaturize.

BACKGROUND

The plasma stove represents an innovative cooking appliance that leverages the unique properties of plasma. It generates a hot plasma flame by ionizing the air with a high-voltage electric discharge, effectively converting electrical energy into thermal energy. This process yields a plasma beam with optimal characteristics, including ideal length and functionality, akin to a traditional flame but with superior heating capabilities for efficient cooking.

The existing plasma stoves need to be further improved for ease of use, miniaturization, electricity safety, and ease of production.

Therefore, there is room for improvement within the art.

SUMMARY

The present disclosure provides a plasma stove to solve at least one of the above problems.

An plasma stove in one embodiment includes a carrier, an electric fire assembly, an electric control device, and an electrical connecting assembly, all designed for a cohesive and efficient operation. The carrier includes a housing and a support platform on a top surface of the housing, providing a stable base for the assembly. The electric fire assembly includes a plasma needle, an electrode tip connected to the plasma needle, and an ignition head. The plasma needle and the ignition head are mounted on the top surface of the housing and received in the support platform. The electric control device includes a circuit board and a step-up transformer that is electrically connected to the circuit board. The circuit board and the step-up transformer are housed within the housing, ensuring a compact design. The plasma needle and the ignition head are electrically connected to the circuit board through the electrical connecting assembly, which may involve direct or indirect connections. The electrical connecting assembly includes a conductive connector attached to the plasma needle and a flexible conductor, the flexible conductor includes a first connecting end and a second connecting end. The first connecting end of the conductor is detachably electrically connected to the connector, while the second connecting end is detachably electrically connected to the circuit board, allowing for easy assembly and serviceability.

The plasma stove design enables a reduction in the thickness of the housing, which in turn simplifies the miniaturization process.

BRIEF DESCRIPTION OF THE DRAWINGS

Implementations of the present disclosure will now be described, by way of embodiments, with reference to the attached figures.

DETAILED DESCRIPTION

Figure 1:
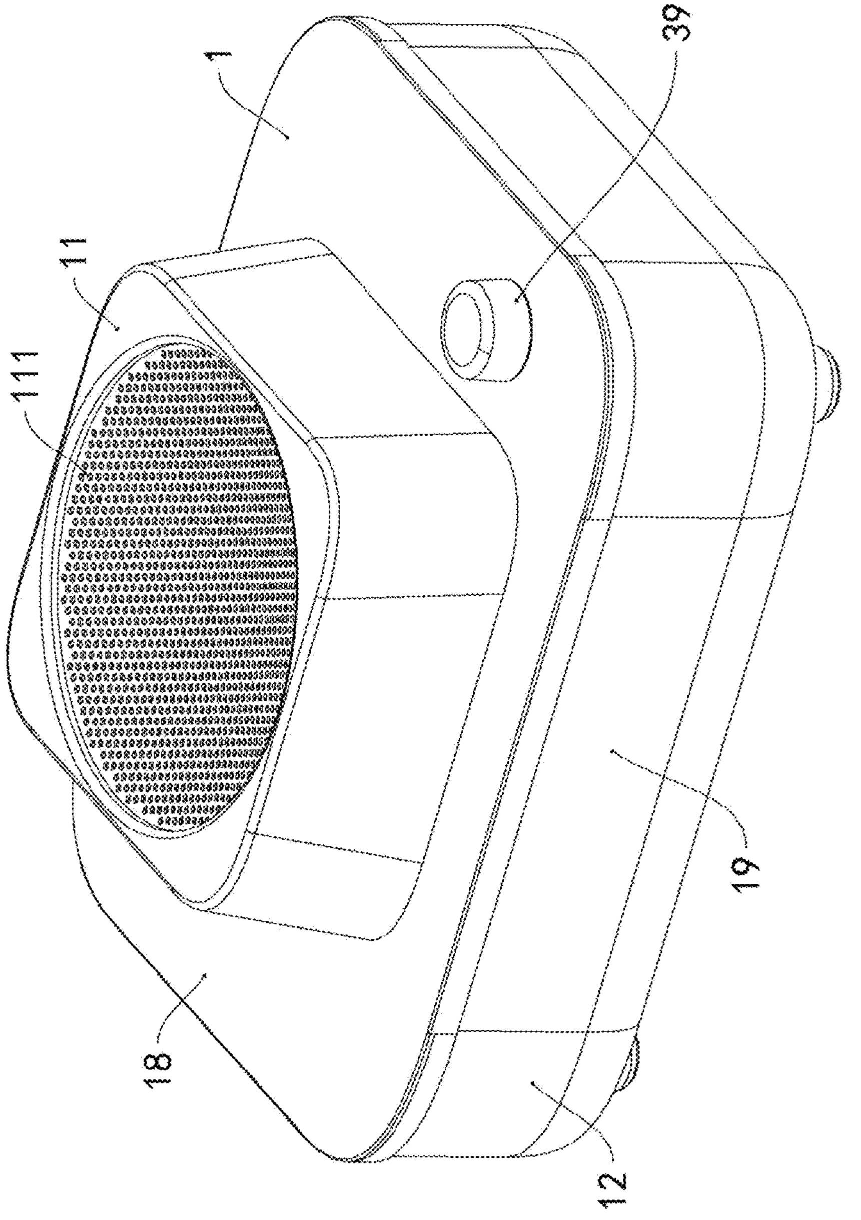
FIG. 1 is a schematic diagram illustrating a plasma stove according to a first embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to “an” or “one” embodiment in this disclosure are not necessarily to the same embodiment, and such references mean “at least one.”

The term “comprising,” when utilized, means “including, but not necessarily limited to”; it specifically indicates open-ended inclusion or membership in the so-described combination, group, series, and the like.

FIG. 1 illustrates a first embodiment of a plasma stove 100. Referring to FIG. 1 to FIG. 5, the plasma stove 100 includes a carrier 1, an electric fire assembly 2, an electric control device 3, and an electrical connecting assembly 4.

The carrier 1 includes a support platform 11 and a housing 12. The support platform 11 is arranged on a top surface of the housing 12. The support platform 11 may be in a shape of a square platform as a whole, and may be fixed to the top surface of the housing 12 by fasteners such as screws.

The electric fire assembly 2 includes a plasma needle 211, an electrode tip 21 connected to the plasma needle 211, and an ignition head 22. The plasma needle 211 and the ignition head 22 are arranged on the top surface of the housing 12 and received in the support platform 11. The plasma needle 211 is made of a hard material and has conductivity. It can be understood that for the embodiment described later in which the plasma needle 211 is integrally connected to a hard rod 41 or a connector 42, a boundary between the plasma needle 211 and the hard rod 41 or a boundary between the plasma needle 211 and the connector 42 is based on top surface of the housing 12. The connector 42 and the hard rod 41 are located on a side of the top surface of the housing 12 facing away from the support platform 11. The plasma needle 211 protrudes from the top surface of the housing 12 facing the support platform 11.

The electric control device 3 includes a circuit board 32 and a step-up transformer 31 electrically connected to the circuit board 32. The circuit board 32 and the step-up transformer 31 are arranged in the housing 12. The step-up transformer 31 and the circuit board 32 may be electrically connected directly through a conductive wire or indirectly through other electrical components and conductive wires. The step-up transformer 31 is used to convert an input low voltage into high voltage.

The plasma needle 211 and the ignition head 22 are electrically connected to the circuit board 32 directly or indirectly through the electrical connecting assembly 4. After the circuit board 32 and the step-up transformer 31 are powered by a power source (not shown, such as a DC power source connected to the mains electricity through conductive wires), the electrode tip 21 can break through the air with high voltage to generate plasma flame, and the pots (not shown) on the electrode tip 21 can be heated by the plasma flame. Usually, an input device 39 electrically connected to the circuit board 32 may be arranged on the housing 12, the input device 39 may be a knob, a button, or a touch screen, which is used to input signals to the circuit board 32 to control the working state of the electric fire assembly 2.

In at least one embodiment, the electrical connecting assembly 4 may include a glue box 412, an electrical connection plate 411, and a hard rod 41 with conductivity. The hard rod 41 is integrally connected to the plasma needle 211. Usually, a metal rod is divided into the hard rod 41 and the plasma needle 211. One end of the hard rod 41 is plugged in and fixed to the electrical connection plate 411 to achieve electrical connection therewith, and the electrical connection plate 411 is electrically connected to the circuit board 32. The glue box 412 is fixed in the housing 12, and the electrical connection plate 411 is arranged in the glue box 412. Glue (not shown) is injected into the glue box 412 and covers the electrical connection plate 411, and the strength and the insulation can be improved after the glue is cured.

Figure 2:
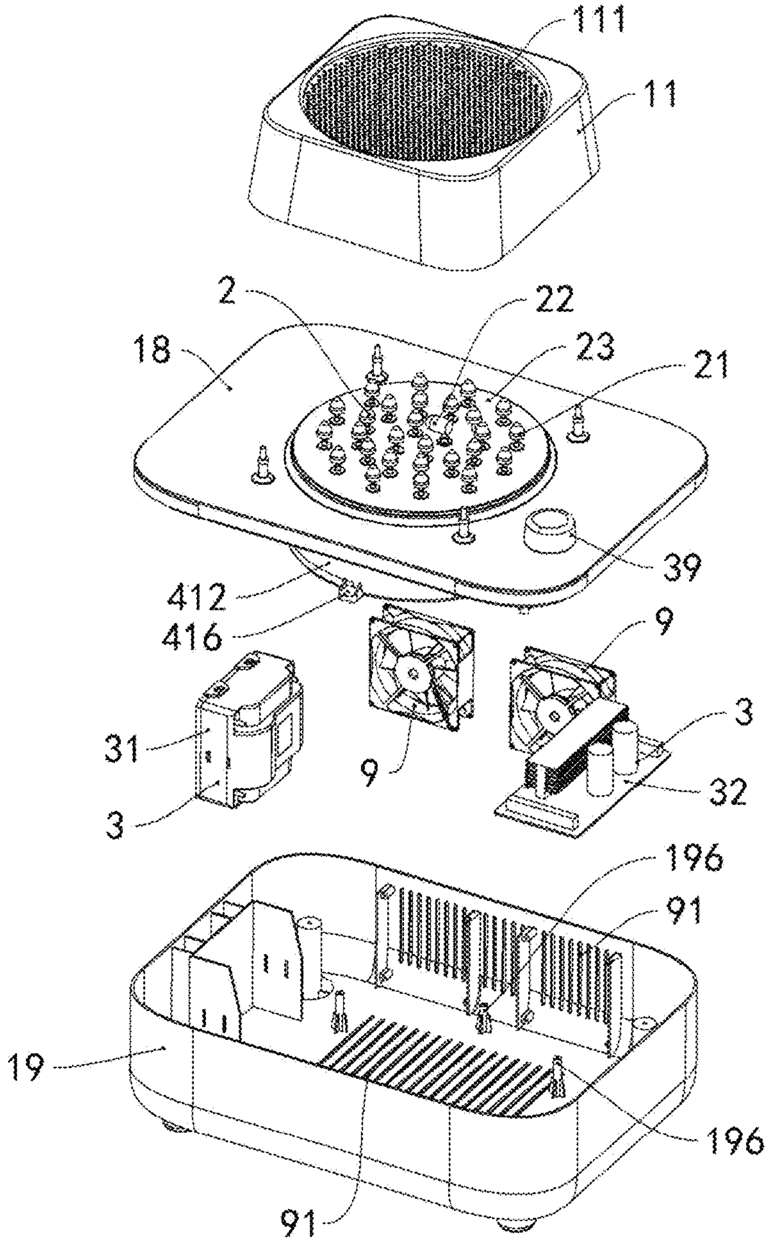
FIG. 2 is an exploded view illustrating the plasma stove according to the first embodiment of the present disclosure.
Figure 3:
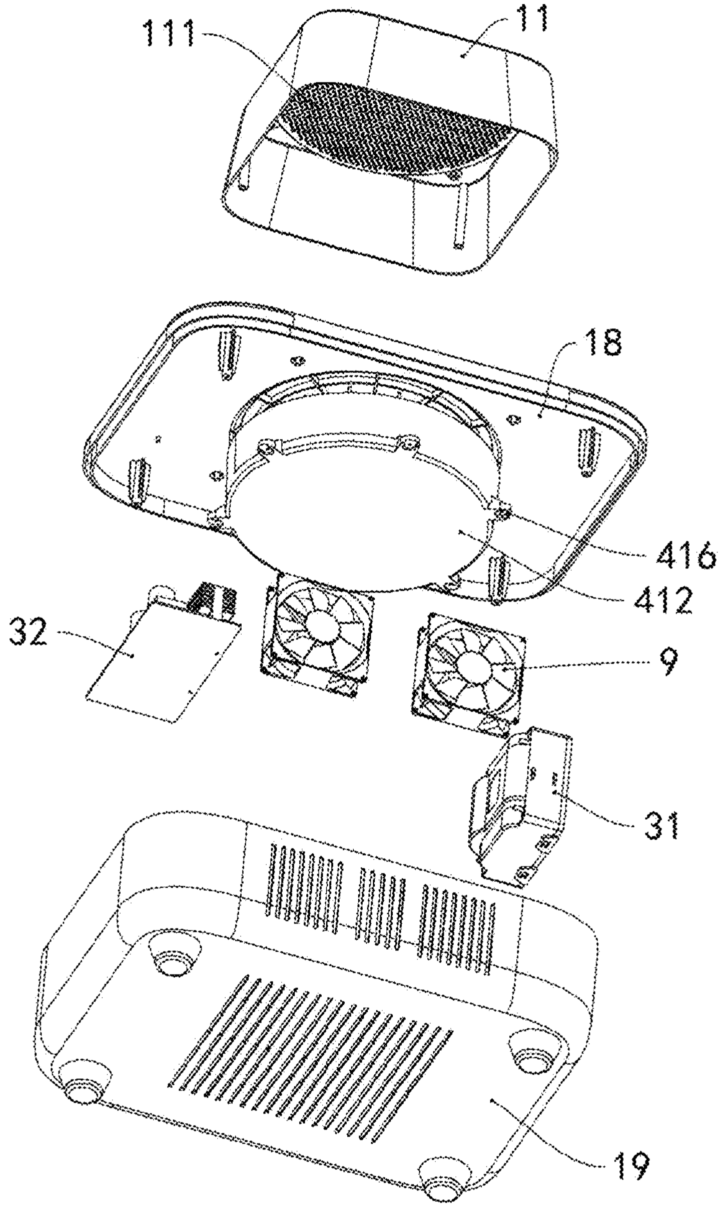
FIG. 3 is an exploded view illustrating the plasma stove viewed from another angle according to the first embodiment of the present disclosure.

In at least one embodiment, referring to FIG. 1, FIG. 2, and FIG. 3, a plurality of ears 416 may be arranged on the glue box 412, and the housing 12 may include a cover 18 and a box body 19. A plurality of connecting rods 196 is arranged in the box body 19, and a screw (not shown) extends through one of the plurality of ears 416 and is threadedly connected with one of the plurality of connecting rods 196, so that the glue box 412 is fixed in the housing 12. In at least one embodiment, the plurality of ears 416 may be arranged in the box body 19, and the plurality of connecting rods 196 may be arranged on the glue box 412. During assembly, the cover 18 and the electric fire assembly 2 are assembled together first, then the electrical connection plate 411 is moved so that the end of the hard rod 41 is plugged in and temporarily fixed to the electrical connection plate 411 (relying on friction, etc.), then the glue box 412 is fastened to the electrical connection plate 411, and then the glue is injected into the glue box 412 from a gap between the glue box 412 and the cover 18, and finally the cover 18 is fixedly connected to the box body 19. When assembling the electrical connection plate 411 and injecting the glue into the glue box 412, there will be no interference from the box body 19, so that the assembly of the plasma stove is more convenient.

Figure 5:
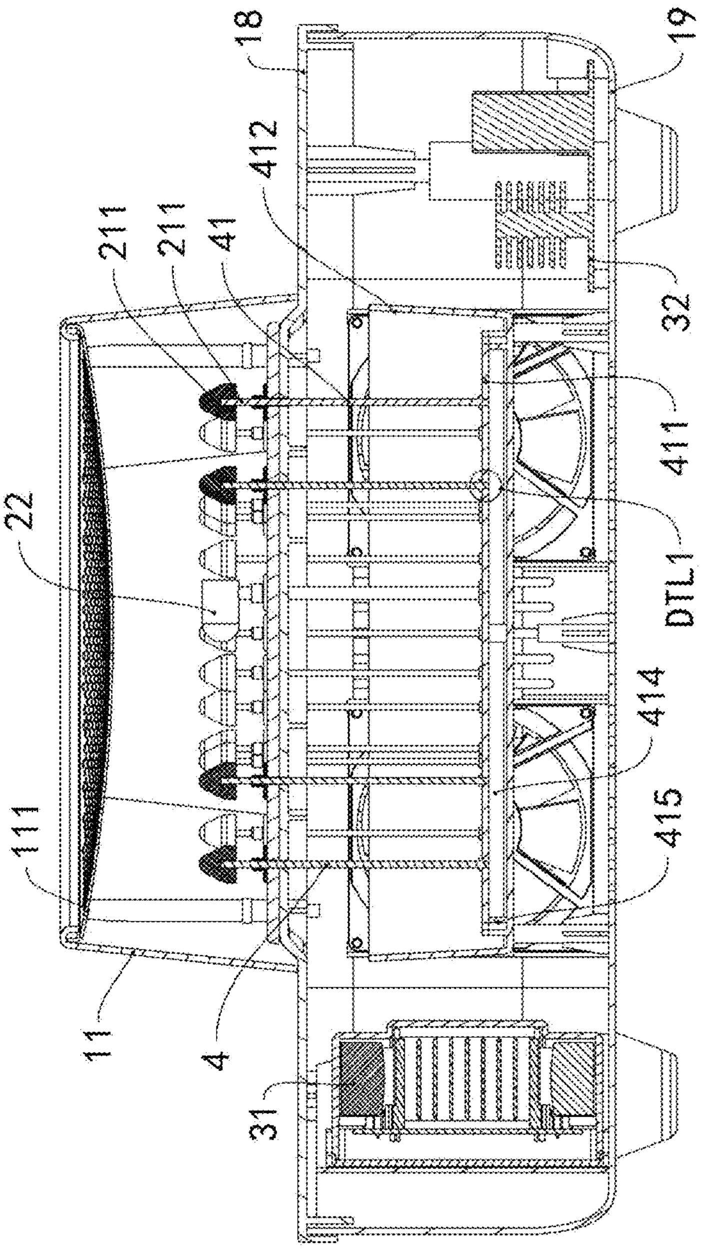
FIG. 5 is a cross-sectional view illustrating the plasma stove viewed from SEC1 in FIG. 4.
Figure 6:
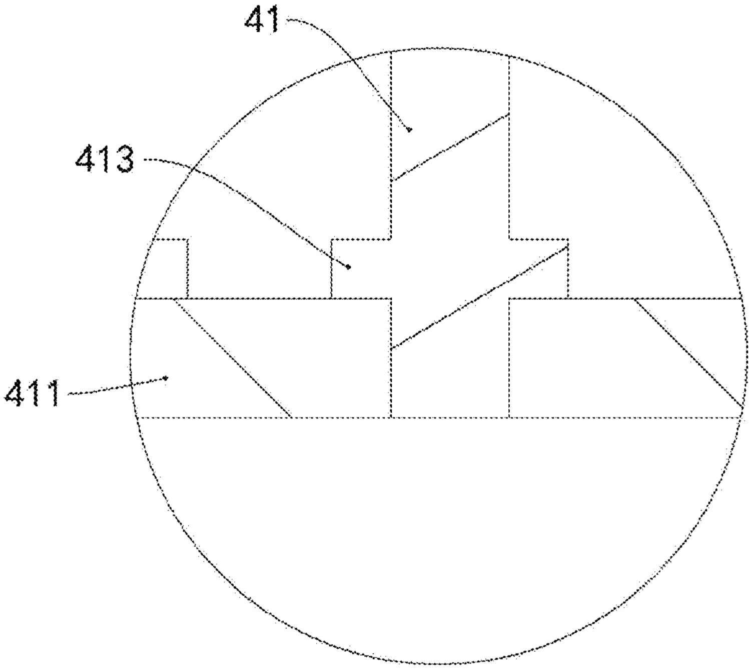
FIG. 6 is a partial enlarged view of the plasma stove at DTL1 in FIG. 5.

In at least one embodiment, referring to FIG. 5 and FIG. 6, a protrusion 413 adjacent to the end of the hard rod 41 may protrude from an outer wall of the hard rod 41 and is used to abut against a top surface of the electrical connection plate 411 facing the plasma needle 211.

In at least one embodiment, referring to FIG. 5, a space 414 may be arranged between the glue box 412 and a bottom surface of the electrical connection plate 411 facing away from the plasma needle 211. For example, a support column 415 may be arranged on the bottom surface of the electrical connection plate 411 or on a surface of the glue box 412 facing the bottom surface of the electrical connection plate 411, and the screw may extend through the electrical connection plate 411 and the support column 415 on the electrical connection plate 411 and may be threadedly connected to the glue box 412, or the screw may extend through the electrical connection plate 411 and may be threadedly connected to the support column 415 in the glue box 412. Due to the existence of the space 414, it can be ensured that the bottom surface of the electrical connection plate 411 is also in contact with the glue, which can improve the strength and insulation.

In at least one embodiment, referring to FIG. 1 and FIG. 5, a metal mesh 111 may be provided at a top of the support platform 11 facing away from the housing 12. A middle area of the metal mesh 111 may be recessed toward the housing 12, which is conducive to fitting with a bottom of the round bottom pot, thereby improving the versatility and heat transfer effect under the premise of stable plasma flame. For example, the metal mesh 111 may be formed by opening a plurality of holes on a metal sheet in the shape of a spherical segment (i.e., a part of a sphere cut off by a plane).

Figure 4:
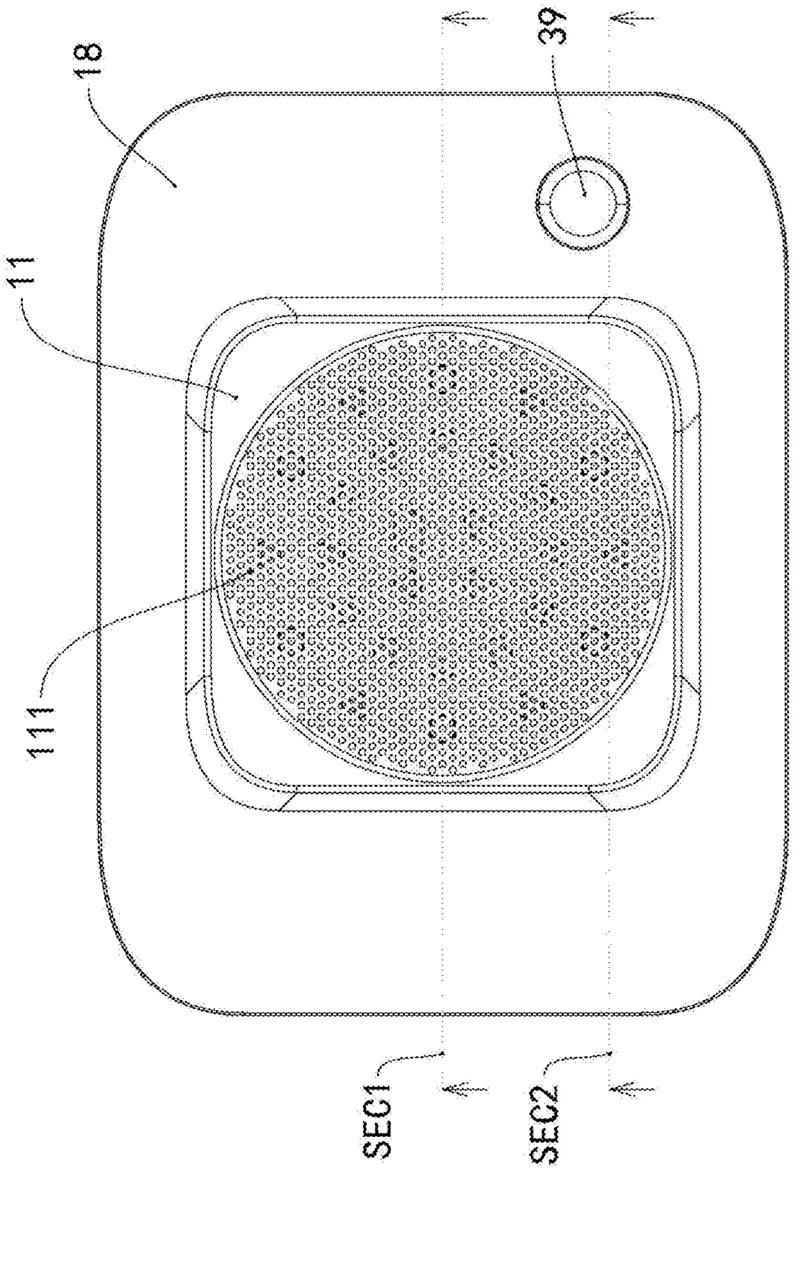
FIG. 4 is a top view of the plasma stove according to the first embodiment of the present disclosure.

In at least one embodiment, referring to FIG. 1 and FIG. 4, when viewed from above, a projection of the support platform 11 is completely located inside the housing 12 to achieve miniaturization. For example, the support platform 11 may be in the shape of a square platform as a whole, and the housing may be in a shape of a rectangular parallelepiped as a whole.

In at least one embodiment, referring to FIG. 5, the circuit board 32 may be located on one side of the electrical connection plate 411, and the step-up transformer 31 may be located on the other side of the electrical connection plate 411, which is conducive to miniaturization. Usually, the plasma stove may be used in a fixed manner, and the step-up transformer 31 may be arranged on a rear side of the glue box 412, so that the radiation of the step-up transformer 31 can also be blocked by at least one of the glue box 412 and the glue inside the glue box 412.

Figure 7:
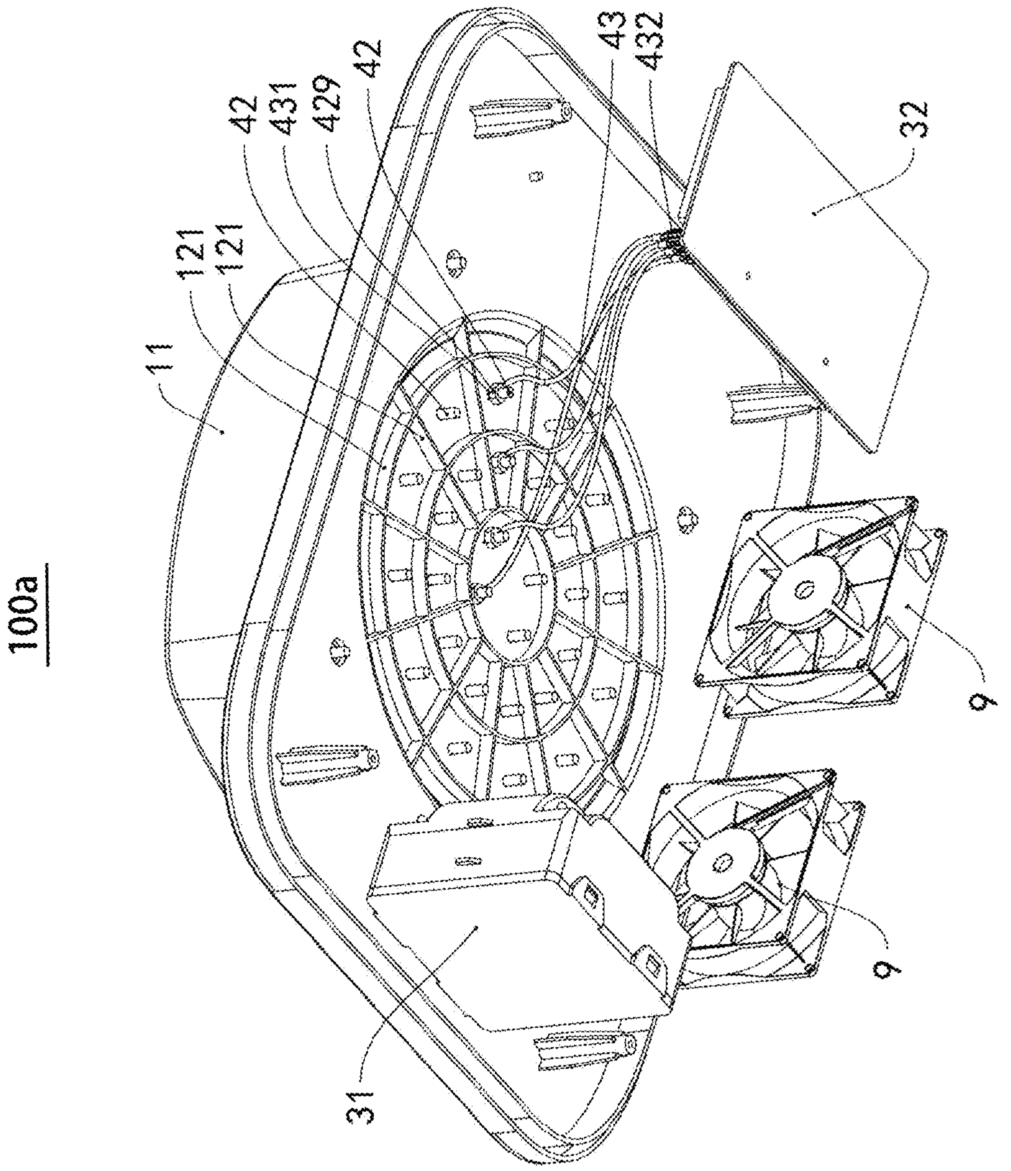
FIG. 7 is a partial schematic diagram illustrating a plasma stove according to a second embodiment of the present disclosure.
Figure 8:
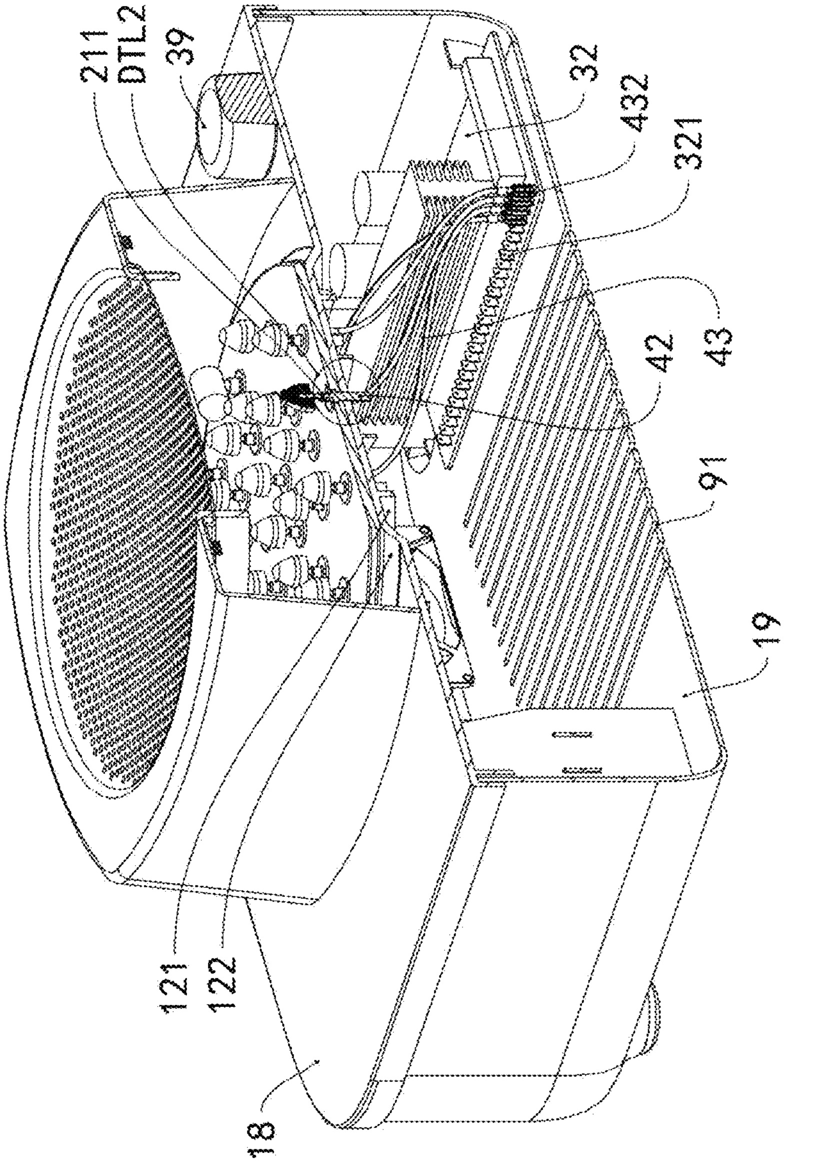
FIG. 8 a cross-sectional view illustrating the plasma stove according to the second embodiment of the present disclosure viewed from SEC2 in FIG. 4.

FIG. 7 illustrates a second embodiment of a plasma stove 100*a*, and the plasma stove 100*a* is different from the plasma stove 100 of the first embodiment in terms of the electrical connecting assembly 4. Referring to FIG. 7 and FIG. 8, in the second embodiment, the electrical connecting assembly 4 includes a connector 42 and a flexible conductor 43. The connector 42 is conductive and integrally connected to the plasma needle 211.

Referring to FIG. 7, FIG. 8, FIG. 9, FIG. 10, and FIG. 11, the flexible conductor 43 includes a first connecting end 431 and a second connecting end 432.

The first connecting end 431 is detachably electrically connected to the connector 42, and the second connecting end 432 is detachably electrically connected to the circuit board 32. In at least one embodiment, the flexible conductor 43 may be a copper wire wrapped with an insulating layer. It can be understood that, compared with the first embodiment, a length of the connector 42 is shorter than a length of the hard rod 41, and there is no need to provide the glue box 412, which allows a thickness of the housing to be reduced, thereby facilitating the thinning of the housing 12. The strength and the insulation of the plasma stove of the second embodiment will be reduced, so that the total power of the plasma stove of the second embodiment is relatively small when used.

The plasma stove 100*a* may further include a nut 429 threadedly connected to the connector 42, and the first connecting end 431 may be a gasket 431*a*. The connector 42 extends through the gasket 431*a*, and the gasket 431*a* is abutted and fixed by the nut 429, so that the first connecting end 431 is detachably electrically connected to the connector 42. It can be understood that the connector 42 is provided with threads, and the gasket 431*a* has conductivity, which is conducive to conveniently assembling the flexible conductor 43 and the connector 42. In at least one embodiment, the first connecting end 431 may be connected to the connector 42 via a quick-plug terminal described later, or the first connecting end 431 and the connector 42 may be welded.

In at least one embodiment, the heights of the plasma needle 211 and the connector 42 are determined by the gasket 431*a* sandwiched between the nut 429 and the housing 12. The gasket 431*a* is clamped by the nut 429 and the housing 12.

In at least one embodiment, the gasket 431*a* may be annular and is sleeved on the connector 42, which is helpful to prevent the first connecting end 431 from separating from the connector 42 and falling off.

In at least one embodiment, the circuit board 32 may include an electrical terminal 321, and the second connecting end 432 may be provided with a quick-plug terminal. The quick-plug terminal is plugged with the electrical terminal 321, so that the second connecting end 432 is detachably electrically connected to the circuit board 32. The quick-plug terminal is conducive to conveniently assembling the flexible conductor 43 and the circuit board 32.

In at least one embodiment, the electric fire assembly 2 may include a plurality of electrode tips 21 and a plurality of plasma needles 211, and the electrical connecting assembly 4 may include a plurality of connectors 42. Referring to FIG. 7, the housing 12 may further include a separator plate 121, any two adjacent connectors 42 are separated by the separator plate 121. The separator plate 121 has insulation properties, which can improve the safety of electricity use.

In at least one embodiment, referring to FIG. 1 and FIG. 8, a bottom end of the separator plate 121 away from the support platform 11 may be located on a side of each of the connectors 42 away from the support platform 11, so that the connectors 42 is completely separated by the separator plate 121 in the height direction, which can improve the safety of electricity use.

In at least one embodiment, referring to FIG. 7 and FIG. 8, the electrode tips 21 may be distributed on multiple concentric rings, and the separator plate 121 may also include multiple circular ring-shaped parts distributed in concentric rings to separate the connectors 42 into multiple concentric rings. Referring to FIG. 2, the number of the electrode tips 21 may be 27, three electrode tips 21 and the ignition head 22 constitute an innermost concentric ring, twelve electrode tips 21 constitute a second outermost concentric ring, and the remaining twelve electrode tips 21 constitute an outermost concentric ring. Referring to FIG. 7, the separator plate 121 may further include multiple radial parts to separate multiple connectors 42 that constitute the same concentric ring. In at least one embodiment, a total power of the electric fire assembly 2 may be controlled by controlling the number of working electrode tips 21. For example, the electrode tips 21 constituting the innermost concentric ring correspond to low-fire heating when working, the electrode tips 21 constituting the innermost concentric ring and the second outermost concentric ring correspond to medium-fire heating when working, all electrode tips 21 correspond to high-fire heating when working. In at least one embodiment, the circuit board 32 may include a plurality of electrical terminals 321, and the plurality of electrical terminals 321 are divided into a first terminal group, a second terminal group, and a third terminal group respectively connected to the electrode tips 21 forming different concentric ring. Since the flexible conductor 43 is usually manually connected to the electrode tip 21 and the circuit board 32, the circular ring-shaped parts of the separator plate 121 facilitates identification of the corresponding relationship between the flexible conductor 43 and each electrode tip 21, so as to correctly connect the electrode tip 21 and the corresponding electrical terminal 321 through the flexible conductor 43.

In at least one embodiment, referring to FIG. 5 and FIG. 8, the support platform 11 is arranged on the cover 18, the cover 18 of the housing 12 is recessed toward the support platform 11 to form a groove 122 located in the support platform 11, and the separator plate 121 is arranged in the groove 122, which is conducive to thinning the housing 12 and ensuring the strength of the housing 12.

Figure 9:
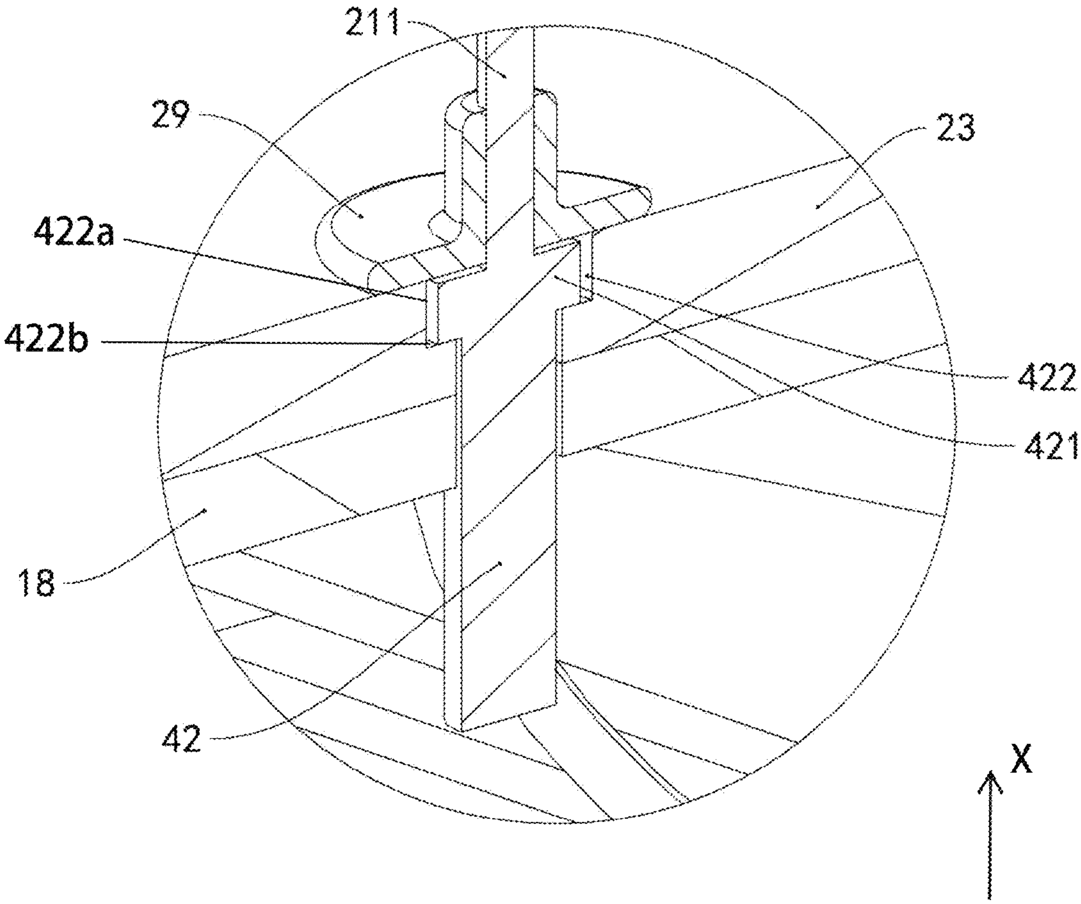
FIG. 9 is a partial enlarged view of the plasma stove at DTL1 in FIG. 8.
Figure 10:
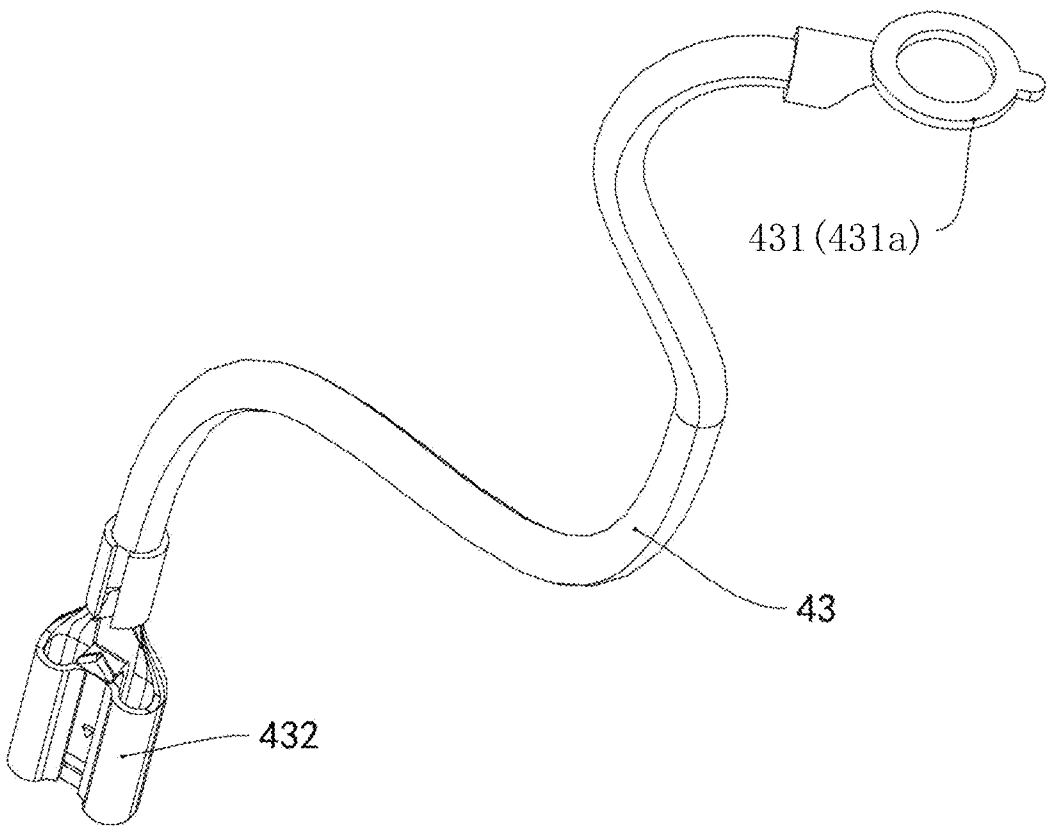
FIG. 10 is a schematic diagram illustrating a flexible conductor according to the second embodiment of the present disclosure.

In at least one embodiment, referring to FIG. 8 and FIG. 9, the plasma needle 211 may extend through an insulating sleeve 29, and the insulating sleeve 29 may be made of insulating materials such as ceramics, which is conducive to improving the safety of electricity use. The insulating sleeve 29 includes a first portion 291 and a second portion 293 protruding from a center of a side of the first portion 291 facing the support platform 11 along a first direction X, and the plasma needle 211 extends through the first portion 291 and the second portion 293 along the first direction X.

In at least one embodiment, referring to FIG. 8 and FIG. 9, the connector 42 includes an end portion of the connector 42 connecting the plasma needle 211, and may further include a stopping flange 421 protruding from a peripheral wall of the end portion of the connector 42. The housing 12 includes a rotation-stopping recess 422, and the stopping flange 421 is inserted into the rotation-stopping recess 422 to prevent the connector 42 from rotating. For example, when viewed from above, the stopping flange 421 and the rotation-stopping recess 422 may be both regular hexagons, and the stopping flange 421 is embedded in the rotation-stopping recess 422. Referring to FIG. 7, when the nut 429 is rotated, the connector 42 will not rotate with the nut 429, which is convenient for assembly.

In at least one embodiment, referring to FIG. 9, the housing 12 may further include a detachable subplate 23, and the rotation-stopping recess 422 is defined by an inner side wall 422*a* and an inner bottom wall 422*b* of the subplate 23. A bottom surface of the stopping flange 421 away from the plasma needle 211 abuts against the inner bottom wall 422*b* of the subplate 23 to prevent the plasma needle 211 and the connector 42 from falling. The first portion 291 covers the inner side wall 422*a* and the inner bottom wall 422*b* of the subplate 23.

A third embodiment of a plasma stove is provided, and the plasma stove of the third embodiment is different from the plasma stove 100*a* of the second embodiment in terms of the flexible conductor 43.

Figure 11:
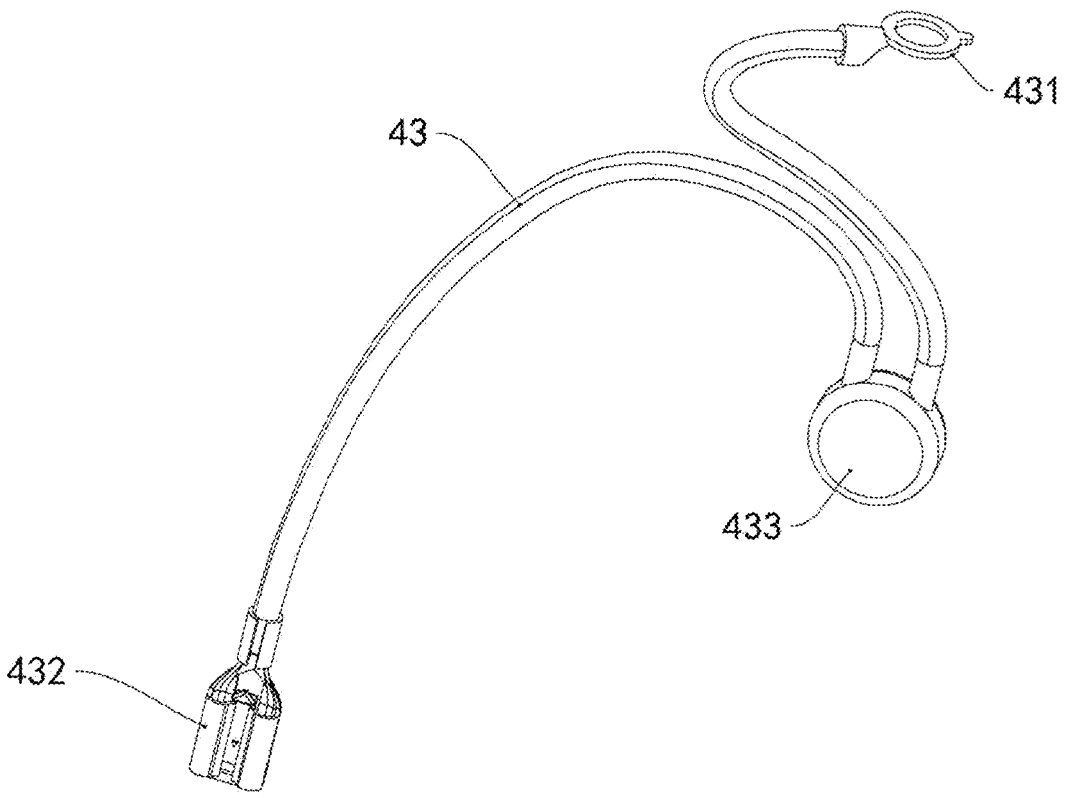
FIG. 11 is a schematic diagram illustrating a flexible conductor according to a third embodiment of the present disclosure.

Referring to FIG. 11, the flexible conductor 43 of the third embodiment further include a capacitor 433, and the capacitor 433 is connected between the first connecting end 431 and the second connecting end 432. Compared with the second embodiment, the capacitor 433 does not need to be arranged on the circuit board 32, so the volume, processing difficulty and cost of the circuit board 32 can be reduced. The flexible conductor 43 with the capacitor 433 is also a standard part, and its cost is relatively low. In summary, the plasma stove of the third embodiment is conducive to miniaturization, especially to reducing the thickness of the housing 12 and costs.

In at least one embodiment, referring to FIG. 7 and FIG. 8, the plasma stove may further include an air driving device 9 arranged in the housing 12, and the housing 12 further includes ventilation holes 91. The air driving device 9 faces the electric fire assembly 2 and is used to dissipate the heat of the electric fire assembly 2. Referring to FIG. 5, the air driving device 9 is located between the step-up transformer 31 and the circuit board 32, and the air driven by the air driving device 9 passes under the connector 42 to dissipate the heat of the capacitor 433, step-up transformer 31 and the circuit board 32, which is beneficial to improving the heat dissipation efficiency. In at least one embodiment, the air driving device 9 may include at least one fan.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A plasma stove comprising:

a carrier comprising a housing and a support platform on a top surface of the housing;

an electric fire assembly comprising a plasma needle, an electrode tip connected to the plasma needle, and an ignition head, wherein the plasma needle and the ignition head are arranged on the top surface of the housing and received in the support platform;

an electric control device comprising a circuit board and a step-up transformer electrically connected to the circuit board, wherein the circuit board and the step-up transformer are arranged in the housing; and an electrical connecting assembly;

wherein the plasma needle and the ignition head are electrically connected to the circuit board directly or indirectly through the electrical connecting assembly, the electrical connecting assembly comprises a connector and a flexible conductor, the connector is conductive and electrically connected to the plasma needle, the flexible conductor comprises a first connecting end and a second connecting end, the first connecting end is detachably electrically connected to the connector, and the second connecting end is detachably electrically connected to the circuit board.

2. The plasma stove of claim 1, further comprising a nut threadedly connected to the connector, wherein the first connecting end is a gasket, the connector extends through the gasket, the gasket is abutted and fixed by the nut.

3. The plasma stove of claim 2, wherein the gasket is sandwiched between the nut and the housing and clamped by the nut and the housing.

4. The plasma stove of claim 3, wherein the gasket is annular and is sleeved on the connector.

5. The plasma stove of claim 1, wherein the first connecting end is connected to the connector via a quick-plug terminal.

6. The plasma stove of claim 1, wherein the first connecting end and the connector are welded together.

7. The plasma stove of claim 6, further comprising an air driving device arranged in the housing, wherein the housing further comprises ventilation holes, the air driving device faces the electric fire assembly.

8. The plasma stove of claim 1, wherein the circuit board comprises an electrical terminal, the second connecting end is provided with a quick-plug terminal, the quick-plug terminal is plugged with the electrical terminal.

9. The plasma stove of claim 1, wherein the flexible conductor comprises a capacitor, and the capacitor is connected between the first connecting end and the second connecting end.

10. The plasma stove of claim 1, wherein the electrical connecting assembly comprises a plurality of connectors, the connector is one of the plurality of connectors, the housing further comprises a separator plate which is electrically insulating, and any two adjacent connectors of the plurality of connectors are separated by the separator plate.

11. The plasma stove of claim 10, wherein a bottom end of the separator plate away from the support platform is located on a side of each of the plurality of connectors away from the support platform.

12. The plasma stove of claim 10, wherein the housing comprises a cover configured for arranging the support platform, the cover of the housing is recessed toward the support platform to form a groove located in the support platform, the separator plate is arranged in the groove.

13. The plasma stove of claim 12, wherein the electrical connecting assembly comprises a plurality of plasma needles, the plasma needle is one of the plurality of plasma needles, each of the plurality of plasma needles is integrally connected to a corresponding one of the plurality of connectors.

14. The plasma stove of claim 13, wherein the housing further comprises a detachable subplate on a side of the cover facing the support platform, each of the plurality of plasma needles protrudes from the subplate of the housing, the plasma stove further comprises a plurality of insulating sleeves on a side of the subplate away from the cover, each of the plurality of plasma needles extends through a corresponding one of the plurality of insulating sleeves.

15. The plasma stove of claim 14, wherein each of the plurality of insulating sleeves is made of ceramics.

16. The plasma stove of claim 14, wherein each of the plurality of insulating sleeves comprises a first portion and a second portion protruding from a center of a side of the first portion away from the subplate along a first direction, each of the plurality of plasma needles extends through the first portion and the second portion along the first direction.

17. The plasma stove of claim 16, wherein the subplate comprises an inner side wall and an inner bottom wall, the inner side wall and the inner bottom wall define a rotation-stopping recess, one of the plurality of connectors comprises an end portion connecting the plasma needle and a stopping flange protruding from a peripheral wall of the end portion, the stopping flange and the end portion of the one of the plurality of connectors is inserted into the rotation-stopping recess, and a bottom surface of the stopping flange away from the plasma needle abuts against the inner bottom wall of the subplate.

18. The plasma stove of claim 17, wherein a cross section of the stopping flange and a cross section of the rotation-stopping recess are each a regular hexagon.

19. The plasma stove of claim 18, wherein the first portion covers the inner side wall and the inner bottom wall of the subplate.

20. The plasma stove of claim 1, wherein a metal mesh is provided at a top of the support platform facing away from the housing, and a middle area of the metal mesh is recessed toward the housing.

* * * * *